(12) United States Patent
Sahni et al.

(10) Patent No.: US 12,306,437 B2
(45) Date of Patent: May 20, 2025

(54) TEMPERATURE-STABILIZED INTEGRATED WAVEGUIDES

(71) Applicant: Cisco Technology, Inc., San Jose, CA (US)

(72) Inventors: Subal Sahni, La Jolla, CA (US); Kamal V. Karimanal, San Jose, CA (US); Gianlorenzo Masini, Carlsbad, CA (US); Attila Mekis, Carlsbad, CA (US); Roman Bruck, Vienna (AT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/506,724

(22) Filed: Nov. 10, 2023

(65) Prior Publication Data

US 2024/0077672 A1  Mar. 7, 2024

Related U.S. Application Data

(63) Continuation of application No. 17/081,852, filed on Oct. 27, 2020, now Pat. No. 11,860,412.

(51) Int. Cl.
*G02B 6/122* (2006.01)
*G02B 6/12* (2006.01)

(52) U.S. Cl.
CPC ....... *G02B 6/1225* (2013.01); *G02B 6/12014* (2013.01); *G02B 2006/12061* (2013.01); *G02B 2006/12107* (2013.01); *G02B 2006/12135* (2013.01)

(58) Field of Classification Search
CPC .............. G02B 6/1225; G02B 6/12014; G02B 2006/12061; G02B 2006/12107; G02B 2006/12135
See application file for complete search history.

(56) References Cited

U.S. PATENT DOCUMENTS

| 8,098,968 B2 * | 1/2012 | Green | G02F 1/025 385/14 |
| 9,239,431 B1 * | 1/2016 | Rakich | G02B 6/12007 |
| 2013/0142483 A1 * | 6/2013 | Hasegawa | G02B 6/1203 385/37 |

* cited by examiner

*Primary Examiner* — Tina M Wong
(74) *Attorney, Agent, or Firm* — Patterson + Sheridan, LLP

(57) ABSTRACT

Embodiments include a photonic device with a compensation structure. The photonic device includes a waveguide with a refractive index which changes according to the thermo-optic effect as a temperature of the photonic device fluctuates. The compensation structure is positioned on the photonic device to counteract or otherwise alter the thermo-optic effect on the refractive index of the waveguide in order to prevent malfunctions of the photonic device.

20 Claims, 9 Drawing Sheets

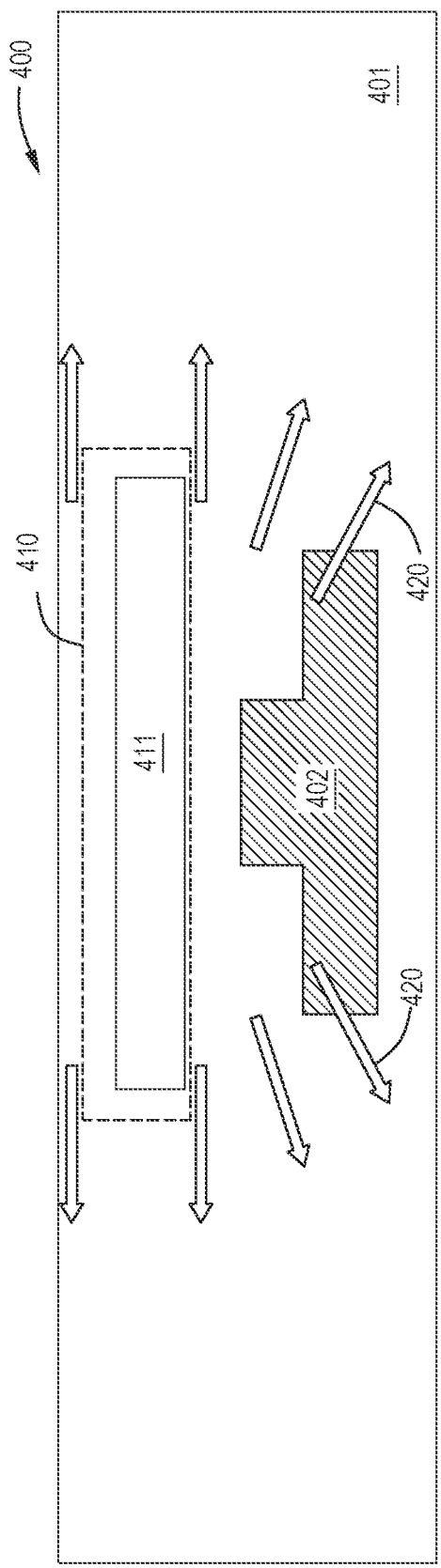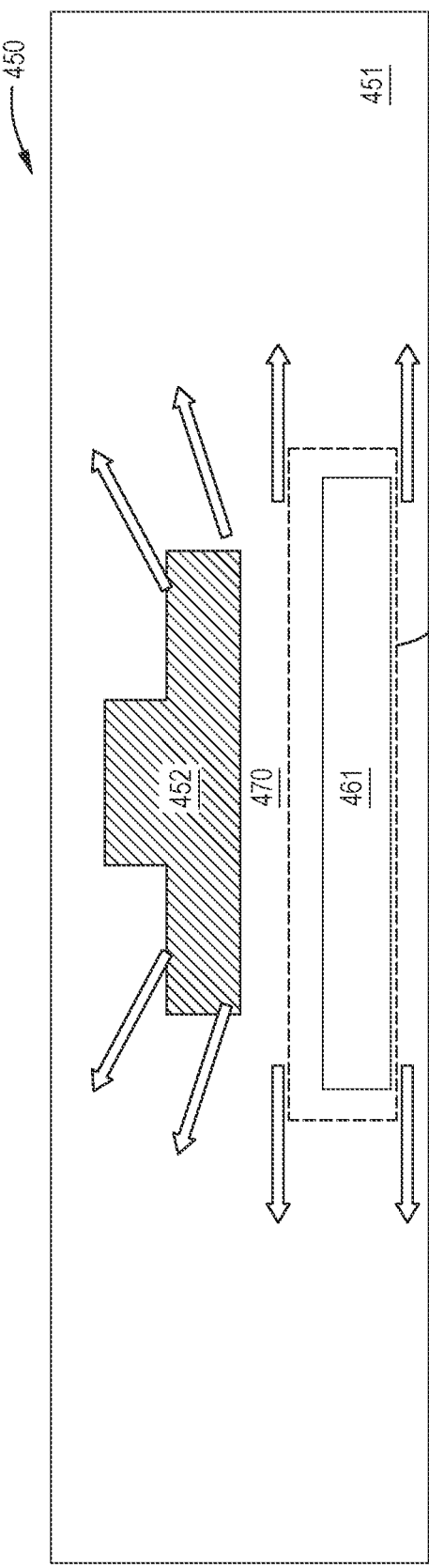
FIG. 4A
FIG. 4B

TEMPERATURE-STABILIZED INTEGRATED WAVEGUIDES

CROSS-REFERENCE TO RELATED APPLICATIONS

This application is a continuation of co-pending U.S. patent application Ser. No. 17/081,852 filed Oct. 27, 2020. The aforementioned related patent application is herein incorporated by reference in its entirety.

TECHNICAL FIELD

Embodiments presented in this disclosure generally relate to signal propagation through optical waveguides in photonic devices. More specifically, embodiments disclosed herein relate to altering refractive index changes in waveguides caused by temperature changes using compensation stresses on the waveguides in order to provide optical stability in photonic devices.

BACKGROUND

In integrated optics, many types of optical functions are used that require precise waveguide properties in order to provide proper functions in the integrated optical device. These precise waveguide properties are subject to change with temperature as the refractive index of materials changes. Previously, waveguides coated with specialized polymers have been used to provide a thermalization of integrated photonic waveguides.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 4A-4B illustrate waveguides with a compensation structure, according to embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
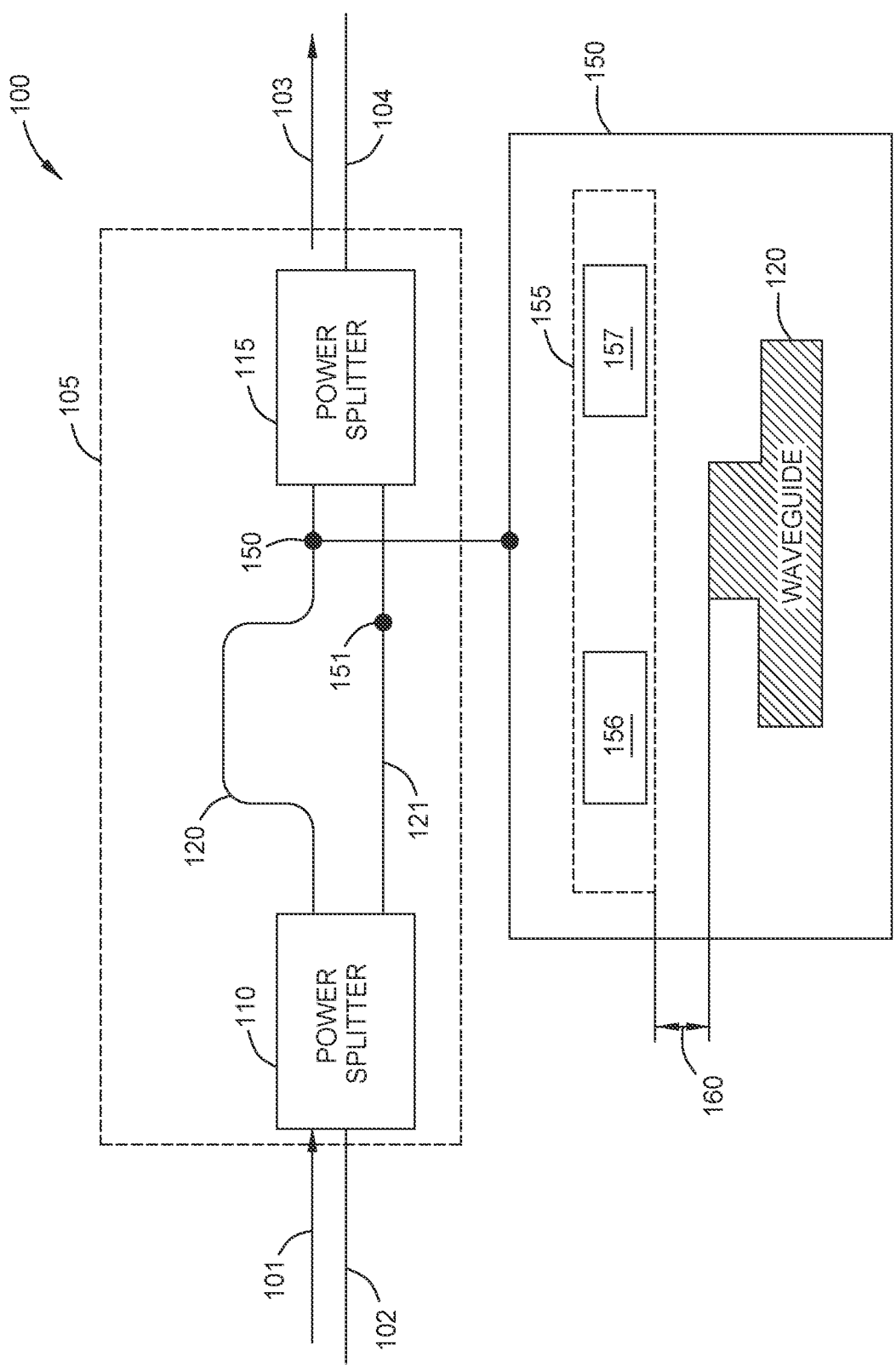
FIG. 1A illustrates a temperature stabilized integrated optical device with temperature-stabilized, according to one embodiment.

One example embodiment includes a photonic device. The photonic device includes a waveguide which includes a refractive index, where the refractive index changes according to a thermo-optic effect as a temperature of the photonic device fluctuates. The photonic device also includes a compensation structure positioned on the photonic device at a first distance from the waveguide, where the compensation structure applies a compensation stress on the waveguide as the temperature of the photonic device fluctuates, where the compensation stress alters the thermo-optic effect on the refractive index of the waveguide.

Another example embodiment includes a delay line photonic arrangement. The delay line photonic arrangement includes a first arm waveguide with a first optical phase; a second arm waveguide with a second optical phase, where a difference between the first optical phase and the second optical phase changes according to a thermo-optic effect as a temperature of the first and second arm waveguides fluctuates. The delay line photonic arrangement also includes a compensation structure positioned at a first distance from at least one arm waveguide of the first arm and second arm waveguides, where the compensation structure applies a compensation stress on the at least one arm waveguide as a temperature of the compensation structure fluctuates, where the compensation stress alters the thermo-optic effect on the difference between the first optical phase and the second optical phase.

Another example embodiment includes a method. The method includes determining a first refractive index of a waveguide in a photonic device, determining a drift of a refractive index of a material of the waveguide due to thermo-optic conditions, determining a size and position of a compensation structure to alter the drift in photonic device properties, and disposing the compensation structure within the photonic device according to the determined size and position. Other embodiments of this aspect include corresponding computer systems, apparatus, and computer programs recorded on one or more computer storage devices, each configured to perform the actions of the methods.

EXAMPLE EMBODIMENTS

As previously mentioned, certain waveguide properties are subject to change with temperature as the refractive index of materials changes. The effects caused by the temperature change can be detrimental, for example, the change in the refractive index may de-tune the response of photonic devices away from their designed wavelength properties and functions.

The loss of the precise signal propagation through waveguides can also cause the optical devices to fail. In order to prevent the failure of the optical devices, additional resources are often consumed by the optical devices (increased power requirements, etc.) to compensate for the changes in the waveguide, leading to undesirable amounts of resource usage for each optical device. Temperature stabilization of optical device properties is thus a desirable goal.

As mentioned above, waveguides coated with specialized polymers have previously been used to provide a thermalization of integrated photonic waveguides. However, these polymer overcoats are not suited for industrial applications, since the polymers are not stable enough to withstand temperatures of semiconductor processes and pose a reliability risk, as they are known to be prone to degradation. Providing temperature stabilization for optical waveguides and stable optic response in photonic devices remains a challenge.

In many optical based applications, photonic devices that drift with temperature create an additional burden on the optical systems which in turn degrades the performance of the optical device, requiring more powerful light sources, and thus increasing power consumption, complexity, and cost of the optical systems. For example, many optical telecommunications standards include wavelength-division multiplexing, which uses wavelength selective elements which select wavelengths in a waveguide in the device. These standards require that such devices have a stable response that does not vary under changing operating conditions such as increasing the operating temperature of the device and corresponding waveguides.

The refractive index of a material represents how fast light or other optical signals travel through the material. The refractive index of materials from which photonic waveguides are made may change depending on environmental conditions, including the temperature surrounding the photonic waveguides and optical device. In industrial applications, the change in temperature during operation of the photonic device is typically the primary cause of changes in the refractive index of the photonic waveguides. This thermo-optic effect on the refractive index is typically positive where the refractive index of the waveguide material positively increases with increasing temperature. The increasing refractive index may not cause problems in some uses of photonic devices, however generally, devices rely on precise waveguide properties and wavelength response and in such cases the refractive index change may cause the device to fail since the light signal propagation through the device changes.

The systems and methods described herein provide for photonic devices and waveguides that include a waveguide with a refractive index subject to the thermo-optic effect as a temperature of the photonic device fluctuates and a compensation structure positioned near the waveguide, where the compensation structure applies a compensation stress on the waveguide as the temperature of the photonic device fluctuates which alters the thermo-optic effect by counteracting or reinforcing the thermo-optic effect the refractive index of the waveguide as described in relation to an example optical device in FIG. 1A.

FIG. 1A illustrates a temperature stabilized integrated optical device, device 100 with temperature-stabilization. The device 100 includes compensation-stress assisted integrated waveguides, according to one embodiment. In some examples, the device 100 includes a delay line photonic arrangement such as arrangement 105. In some examples, the arrangement 105 is a Mach-Zehnder interferometer or other type of a wavelength-selective photonic element. The arrangement 105 receives an optical signal 101 via a waveguide 102 and outputs an optical signal 103 via a waveguide 104. The arrangement 105 may also include power splitters 110 and 115 which serve to split, combine, or otherwise alter the optical signals 101 and 103. For example, the power splitter 110 may split the optical signal 101 into two signals which propagate through the arrangement 105 on separate waveguides.

In some examples, the arrangement 105 is a delay line arrangement which includes a first arm 120 and a second arm 121, where the second arm 121 and the first arm 120 are waveguides which carry the split optical signal and allow for phase shifting and other optical signal alterations in the arrangement 105. Delay line arrangements are particularly susceptible to refractive index changes since the delay lines require precise phase differences between the various lines in the delay line arrangements in order to function properly. For example, delay lines may be used to introduce wavelength-dependent properties for many applications (e.g., optical filters or optical multiplexers/optical demultiplexers). In some examples, delay lines provide an exact optical phase difference between the first arm 120 and the second arm 121 which can be utilized to alter the optical signal 103 at the output of the arrangement 105. The phase difference is subject to change with temperature as the refractive index of materials changes. In some examples, since the first arm 120 is longer than the second arm 121, a net effect is created that varies the phase difference as shown in FIG. 1B.

Figures 1B, 2A:
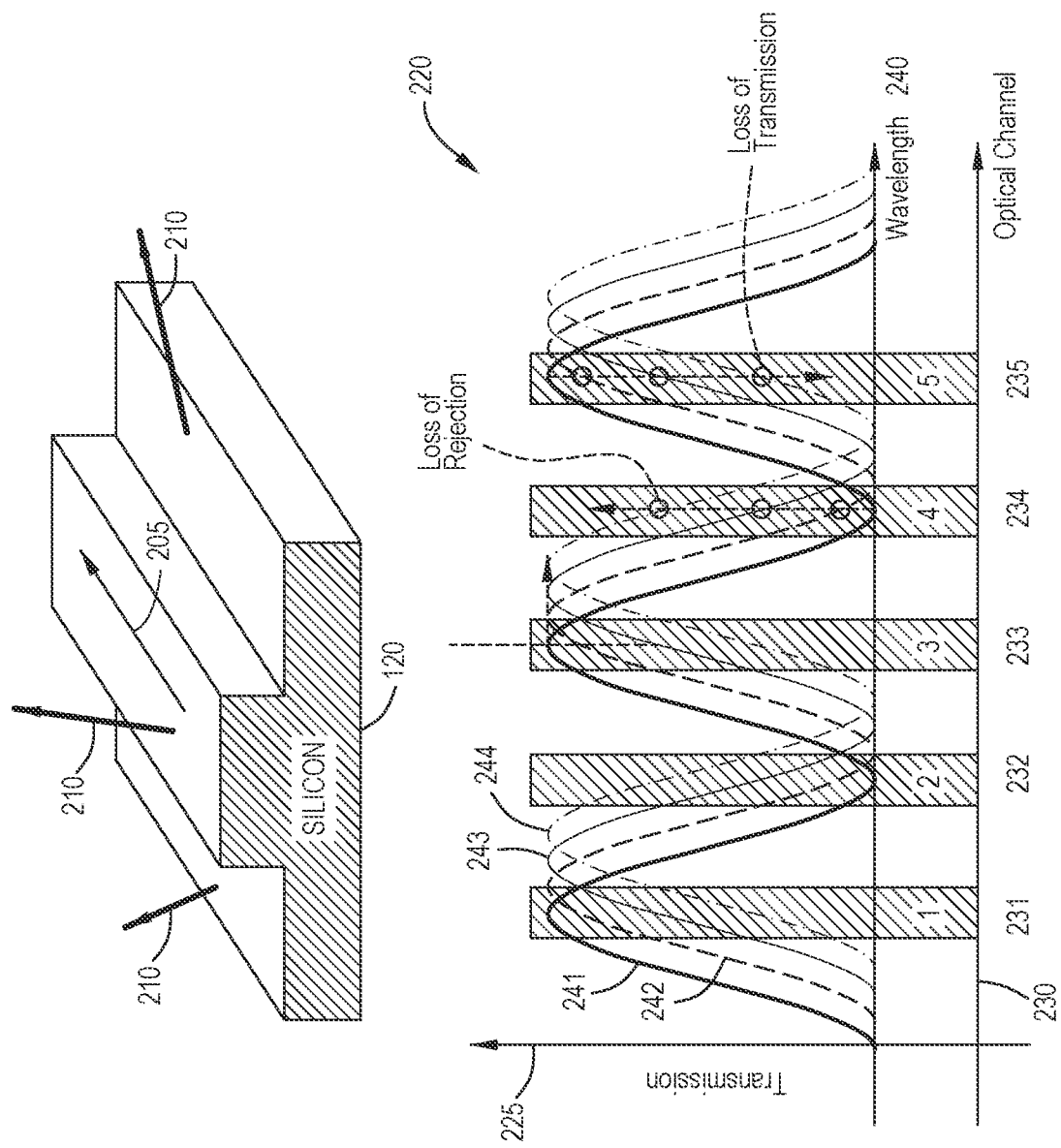
FIG. 1B is a graph illustrating varying optical signal performance due to a changing temperature, according to one embodiment.
FIG. 2A illustrates a waveguide, according to one embodiment.

FIG. 1B is a graph 220 illustrating varying optical signal performance due to a changing temperature in an optical device, such as the arrangement 105. The graph 220 includes an axis 225 which illustrates wavelength transmission patterns for an optical signal, such as the optical signal 205, axis 240 which illustrates wavelength propagation, and axis 230 which illustrates channels 231-235, where channels 231, 233, and 235 accept an optical signal and channels 232 and 234 reject an optical signal. The graph 220 also includes a sinusoidal transmission pattern of a signal 241 (e.g., the optical signal 205) in a waveguide and shifting signals 242/243/244 where the signal 241 shifts its transmission pattern to the pattern of the shifting signals 242/243/244 as the temperature of the arrangement 105 or any of its subcomponents changes. When the temperature change has not significantly altered the signal propagation, the signal 241 is accepted at the channels 231, 233, and 235 and rejected at the channels 232 and 234 such that the arrangement 105 in FIG. 1A is functioning properly.

The expansion of the waveguide in first arm 120 and changing refractive index described in relation to in FIG. 2A, alters the optical signal propagation through the waveguides in the device 100. For example, the signal 241 shifts into the shifting signal 244 such that shifting signals 242/243/244 fall outside the channels and thus cause a loss of rejection and a loss of transmission of the signals in the photonic device. The drift of the optical signal may detune photonic elements such as the arrangement 105. As the photonic elements detune, their performance degrades, which is compensated for by using more powerful light sources (increases power consumption, thermal dissipation, cost) and/or active tuning of elements which increases a complexity, cost, and power consumption of the device.

Returning back to FIG. 1A, to compensate for the thermo-optical effects on the optical system and to keep the phase difference constant, another effect is applied to counterbalance the thermo-optic effect on the arrangement 105. To provide the compensation and counterbalancing in the arrangement 105, a compensation structure 150 is included on at least the first arm 120. In some examples, the compensation structure 150 is positioned near or in close proximity to the first arm 120 to provide a compensation stress on the first arm waveguide as a temperature of the compensation structure increases. For example, the compensation structure 150 may include at least two split material lines, such as split lines 156 and 157 in a material layer 155 positioned at a first distance 160 above or below the first arm 120, where the split lines provide a compressive compensation stress on the waveguide of the first arm 120, which alters or reduces the refractive index change of the waveguide as the temperature increases. This alteration or reduction to the refractive index change may be partial (e.g., the total refractive index change is not compensated for) such that the arrangement 105 remains optically stable. Additional example compressive compensation structures with compressive compensation stresses are described in more detail in relation to FIGS. 2B, 3A-B and 5A.

In another example the compensation and counterbalancing in the arrangement 105 may include a compensation structure 151 included on at least the second arm 121. In some examples, the compensation structure 150 is positioned near or in close proximity to the first arm 120 to provide a compensation stress on the reference arm waveguide as a temperature of the compensation structure increases. In some examples, the arrangement 105 includes only one of compensation structures 150 and 151. In an example, where the compensation structure 151 is just provided on the second arm 121, the compensation structure 151 may provide a tensile compensation stress as described in relation to FIGS. 4A-4B and 5B.

In some examples, the compensation structure 151 is positioned near or in close proximity to the second arm 121 to provide a tensile stress on the second arm waveguide as a temperature of the compensation structure increases. This alteration or increase provided by the tensile stress to the refractive index change may be partial (e.g., the total refractive index change is not adjusted or reinforced) such that the arrangement 105 remains optically stable. In some examples, the compensation structure 151 may include any of the tensile compensation structures described in more detail in relation to FIGS. 4A-B and 5B. Additionally, the arrangement 105 may include one or both of the compensation structures 150 and 151 in order to provide optical stability in the optical system, device 100.

In order to compensate for the expansion 210, the compensation structures 150 and 151 include materials that provide a compensation stress on their respective first arms. For example, the split lines 156 and 157 may include metal material layers such as aluminum or other metals common in the fabrication of integrated optical devices. For example, backend metal lines on top of photonic layers are part of the processes in semiconductor foundries and may be used to apply the metal material of the compensation structures described herein. The metal materials making up the split lines 156 and 157 have considerably larger thermal expansion coefficients (e.g., around 10 times larger) than the crystalline materials the photonic waveguide in the first arm 120 is typically made from (e.g. silicon, silicon nitride, silicon oxide), which allows for the metal material to expand quicker than the waveguide materials and exert pressure or stress on the surrounding materials, including the waveguide of the first arm 120.

Additionally, other semiconductor, nonmetal, or metalloid materials, such as germanium, can also be used to induce thermal stress in the waveguide core in nonmetal material layers. For instance, germanium is available in many photonic platforms as it is used in active devices and detectors. While germanium does not possess as large a thermal expansion coefficient as most metal materials, germanium still expands 2-3 times more than silicon materials making up waveguides. In addition, germanium's extraordinary hardness exerts large forces on surrounding materials which in turn may be leveraged to enact compensation stresses on the waveguides.

Additionally, materials that providing small thermal expansions or negative thermal expansions may also be used to provide to induce thermal stress, such as tensile stresses. Small thermal expansion materials include silicon nitride, fused quartz, diamond, or iron-nickel alloys. Negative thermal expansion materials may include alloys of Hafnium or Zirconium, such as Zirconium tungstate.

Figure 2B:
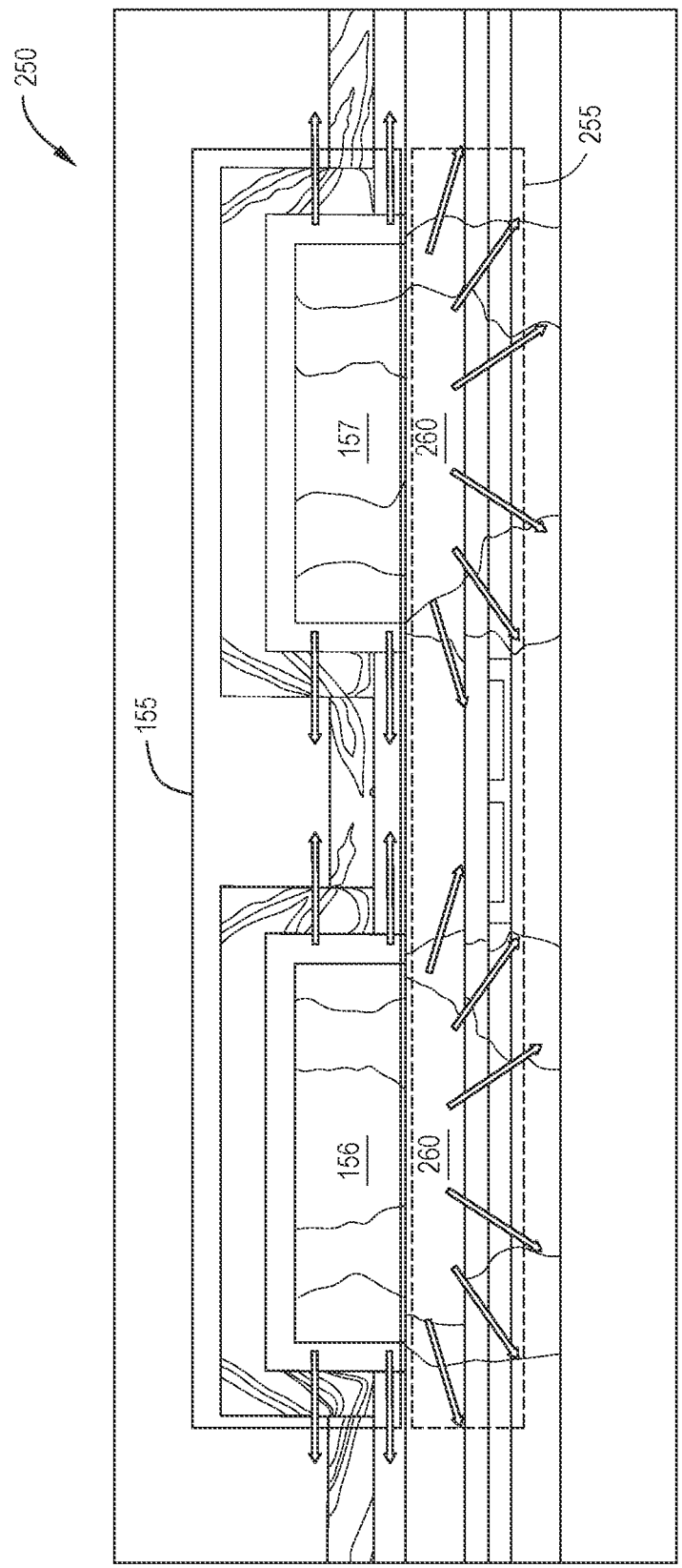
FIG. 2B illustrates a waveguide with a compensation structure, according to one embodiment.

In the example shown in compensation structure 150, because of the mismatch in their thermal expansion, when the temperature increases, the split lines 156 and 157, depending on their placement, apply additional compressive or tensile stress on the nearby waveguide material as shown in FIG. 2B.

In some examples, a current may be introduced to the split lines 156 and 157 which allows for a controlled expansion or diminution to the material lines to be introduced to the compensation structures 150 and 151. The thermal expansion and subsequent compensation stresses may be controlled apart from the temperature fluctuations of the arrangement 105.

While compensation structures 150 and 151 are shown as points in FIG. 1A for simplicity, the compensation structures 150 and 151 may be disposed over an entire length of the waveguides of first arm 120 and second arm 121 or a portion of each waveguide. Furthermore, the compensation structures may cover waveguides over lengths spanning from tens of micrometers to millimeters. Additionally, while the compensation structures described herein are in reference to use in delay line arrangements, the compensation structures may be used in relation to any waveguide subject to the thermo-optic effect. The compensation structures, including compensation structures 150 and 151 as well as other compensation structures on non-delay line waveguides utilize a material difference between the compensation structures and the waveguides to provide compensation stresses.

For example, the split lines 156 and 157 are composed of materials that are different from the material composition of the waveguide of the first arm 120. For example, as shown in FIG. 2A, the waveguide of first arm 120 may include a silicon-based waveguide. As the temperature of the device 100, the arrangement 105, the first arm 120, and/or the second arm 121 increases, the refractive index of the waveguides changes and in turn alters a propagation of an optical signal 205 propagating through the arrangement 105, as shown in FIG. 1B.

FIG. 2B illustrates a waveguide with a compensation structure, according to one embodiment. Arrangement 250 includes the first arm 120 waveguide as well as the split lines 156 and 157 in the material layer 155 of the compensation structure 150. As the split lines 156 and 157 heat up, the material expands and applies compensation stress 260 to a material structure 255 between the split lines 156 and 157 and the first arm 120. The compensation stress 260 alters or counteracts the expansion 210 in FIG. 2A such that the refractive index in the first arm 120 changes less, or not at all, as the temperature of the first arm 120 and the compensation structure 150 increases. While shown in FIGS. 1 and 2B as split lines materials above a waveguide, the compensation structure may be placed or positioned in many locations around or in close proximity to a waveguide as shown in FIGS. 3A-5B.

Figure 3A:
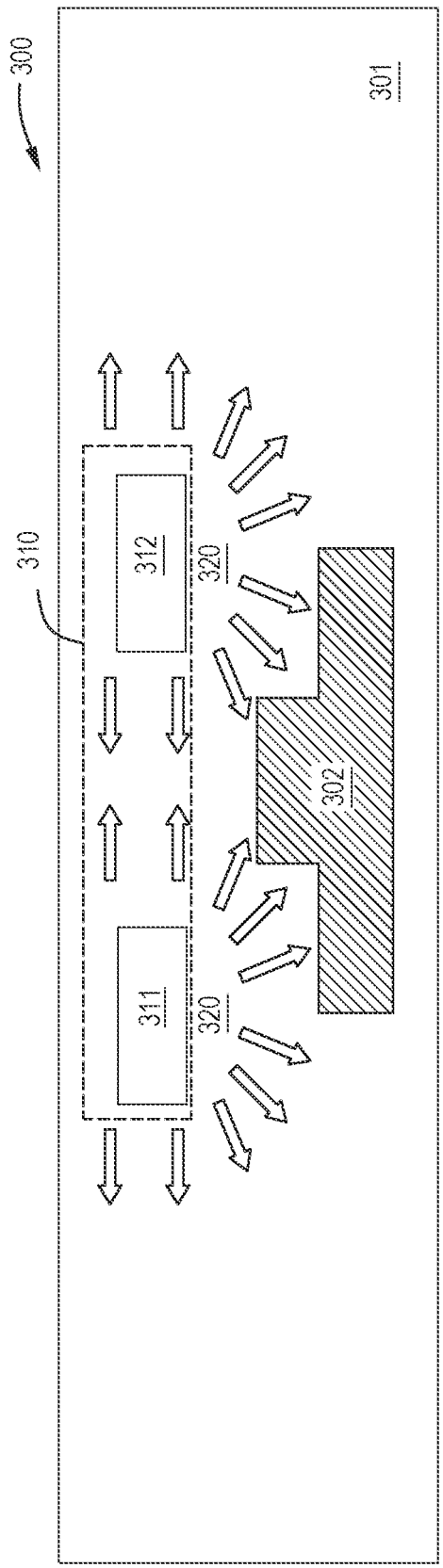
FIGS. 3A-3B illustrate waveguides with a split line compensation structure, according to embodiments.
Figure 3B:
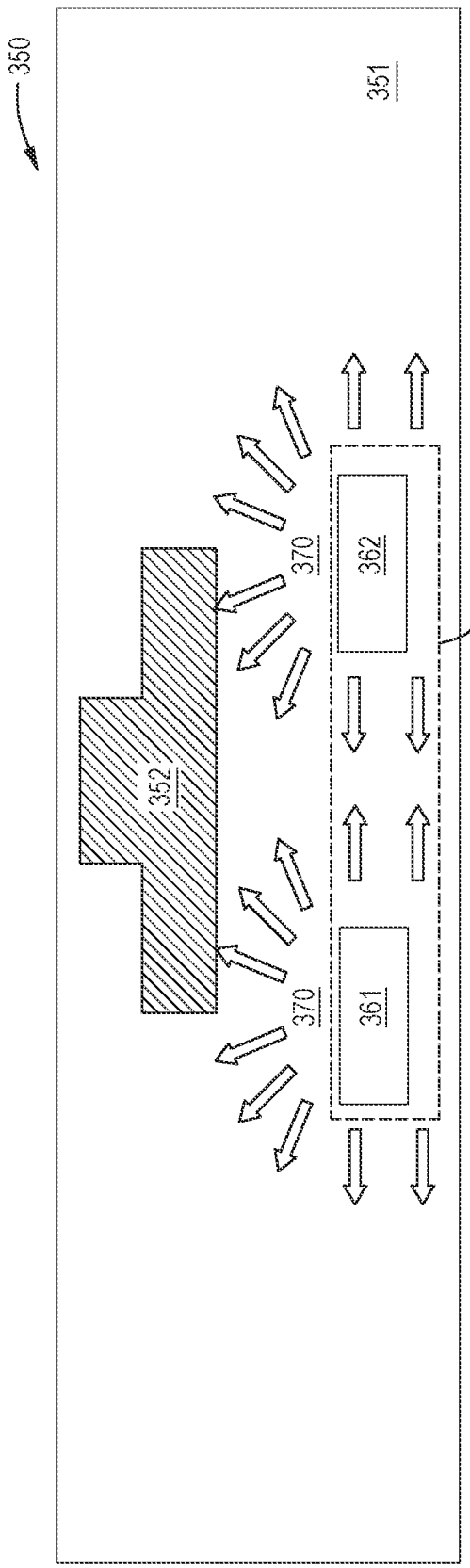

FIGS. 3A-3B illustrate waveguides with a split line compensation structure, according to embodiments. FIG. 3A illustrates arrangement 300 which includes a photonic device 301, waveguide 302, and a compensation structure 310 with split material lines 311 and 312 disposed above the waveguide 302 and within the photonic device 301. For example, the compensation structure 310 may be disposed within an internal layer of the photonic device 301. FIG. 3B illustrates arrangement 350 which includes a photonic device 351, waveguide 352, and a compensation structure 360 with split material lines 361 and 362 disposed below the waveguide 352 and within the photonic device 351. The compensation structures 310 and 360 apply compressive compensation stresses 320 and 370, respectively. For example, the two lines at the side of waveguides 302 and 352 push towards the waveguide when the two lines expand. This compressive stress reduces the refractive index of the waveguide material. Thus, a photoelastic coefficient of the resulting compressive stress is negative and alters or otherwise counteracts the positive thermo-optic effect in the waveguides 302 and 352.

FIGS. 4A-4B illustrate waveguides with a compensation structure, according to embodiments. FIG. 4A illustrates arrangement 400 which includes a photonic device 401, waveguide 402, a compensation structure 410 with single material line 411 disposed above the waveguide 402 and within the photonic device 401. FIG. 4B illustrates arrangement 450 which includes a photonic device 451, waveguide 452, a compensation structure 460 with single material line 461 disposed below the waveguide 452 and within the photonic device 451. The compensation structures 410 and 460 apply tensile compensation stresses 420 and 470, respectively. For example, the net compensation stresses acting at the side of waveguides 402 and 452 away from the waveguide when the two lines expand. This tensile stress increases the refractive index of the waveguide material. In this example, a photo-elastic coefficient of the resulting tensile stress is positive and may be utilized along with the positive thermo-optic effect in the waveguide 402 and waveguide 452 For example, instead of providing the compensation structure 150 on the first arm 120, the compensation structure 151 can be provided on the second arm 121 in order to alter or otherwise increase the refractive index to match the changes in the first arm 120 caused by the thermo-optic effects.

Figure 5A:
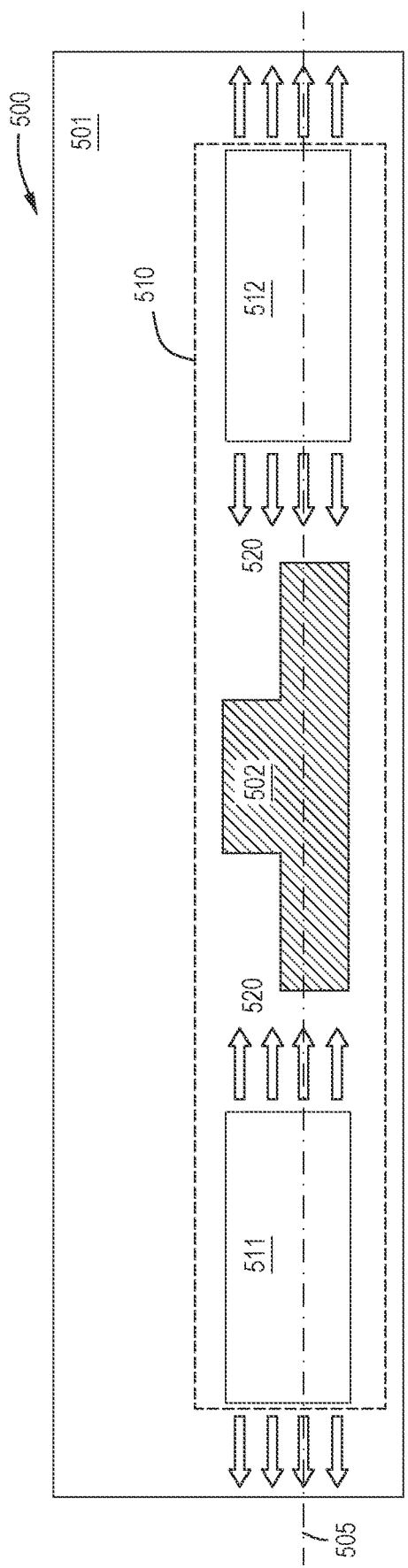
FIGS. 5A-5B illustrate waveguides with a split line compensation structure, according to embodiments.
Figure 5B:
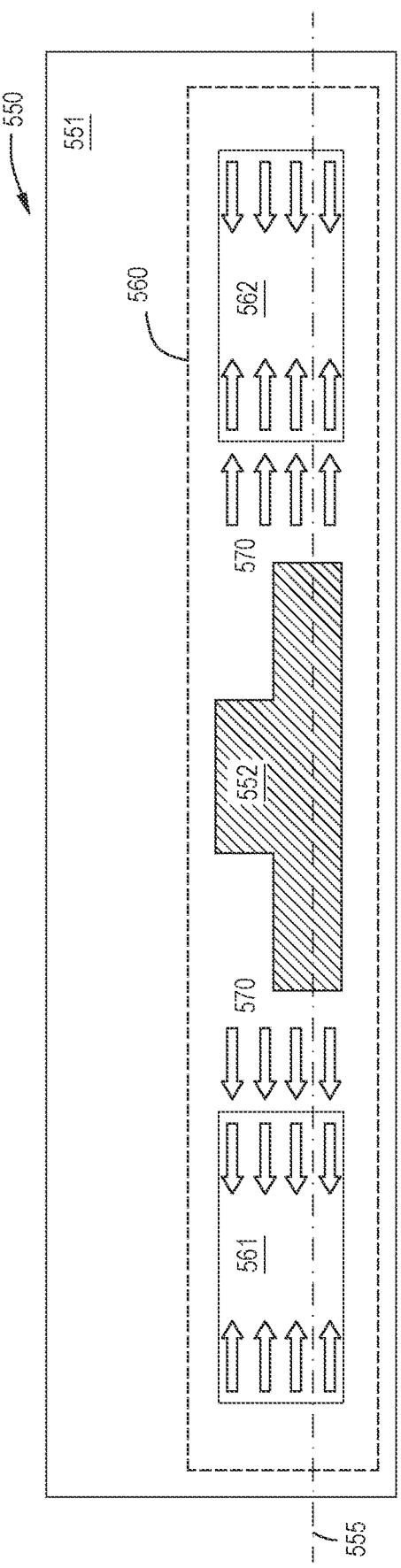

FIGS. 5A-5B illustrate waveguides with a split line compensation structure, according to embodiments. FIG. 5A illustrates arrangement 500 which includes a photonic device 501, waveguide 502, a compensation structure 510 with split material lines 511 and 512 disposed in a same material or lateral plane, plane 505, as the waveguide 302. The split material lines 511 and 512 apply compressive stress 520 on waveguide 502 as a temperature of the compensation structures 510 increases.

In another example, FIG. 5B illustrates arrangement 550 which includes a photonic device 551, waveguide 552, a compensation structure 560 with split material lines 561 and 562 disposed in a same material or lateral plane, plane 555, as the waveguide 502. In some examples, the split material lines 561 and 562 are composed of a material that expands less or even contracts relative to a material around the split material lines 561 and 562 and less than a material of the waveguide 552, or even contracts. Since the split material lines 561 and 562 expand less than the surrounding material, or contract, the split material lines 561 and 562 apply a tensile compensation stress 570 on the waveguide 552 as the temperature increases. Materials providing small thermal expansions, where the expansion is less than the surrounding material may include silicon nitride, fused quartz, diamond, or iron-nickel alloys, while materials that contract via negative thermal expansion may include in alloys of Hafnium or Zirconium, such as Zirconium tungstate.

Figure 6:
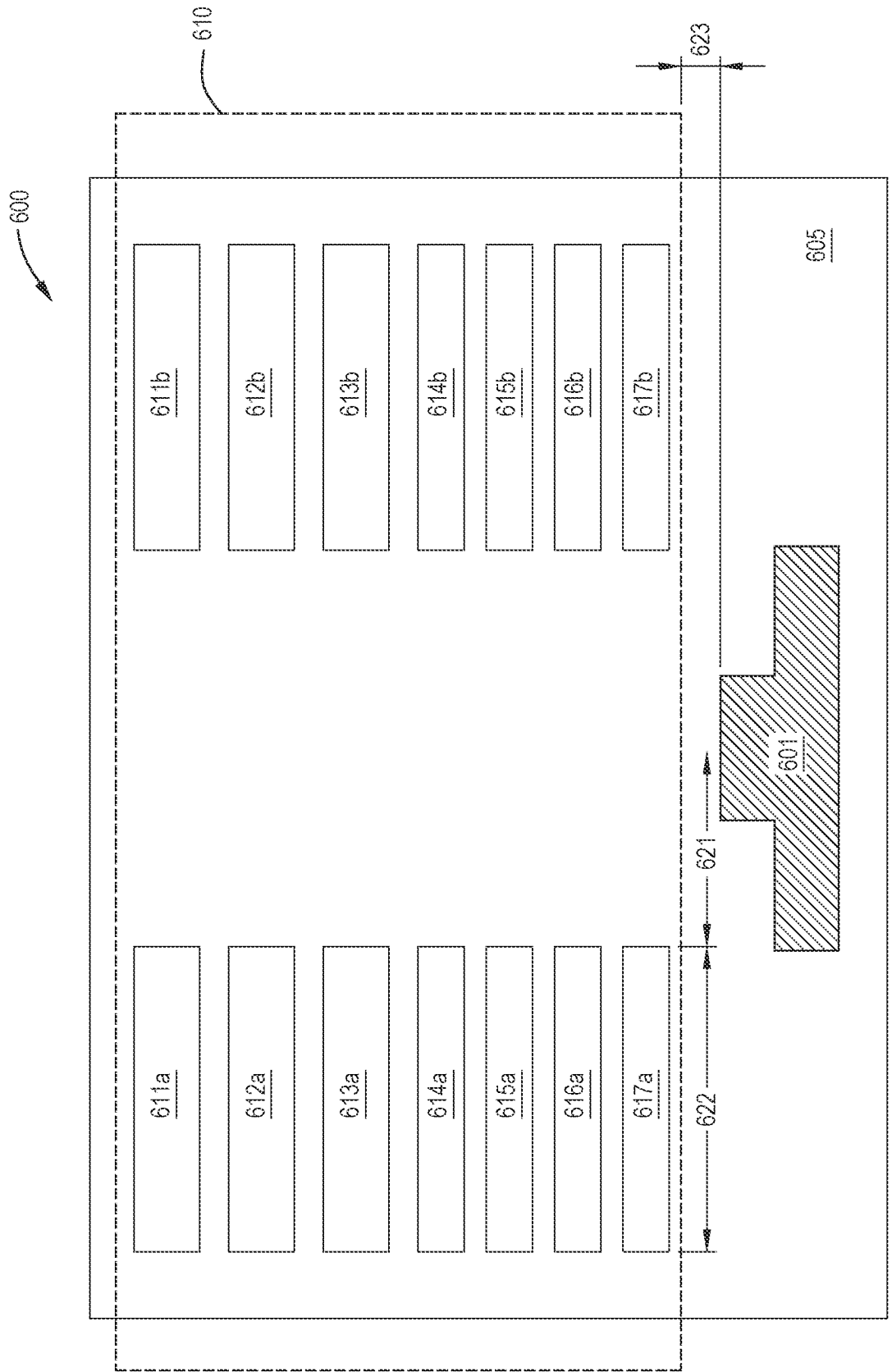
FIG. 6 illustrates a waveguide with a compensation structure, according to one embodiment.

In each of the embodiments described in relation to FIGS. 3A-5B, the arrangements include a single compensation structure with a single material layer making up the compensation structure. In another example, the compensation structure may include any combination of the arrangements shown in FIG. 3A-5B as well as multiple or stacked structures as shown in FIG. 6. For example, the compensation structure may include multiple layers above, below, and/or surrounding the waveguide in any combination of the arrangements shown in FIGS. 3A-6.

FIG. 6 illustrates a waveguide with a compensation structure, according to one embodiment. Arrangement 600 includes photonic device 605, waveguide 601 and the compensation structure 610. In this example, the compensation structure includes multiple material layers in the material lines 611a-617b which interact with each other to provide a compensation stress on the waveguide 601 to prevent the refractive index in waveguide 601 from changing during operation. Different materials may be used in individual layers. For example, the material lines 611a-617b may include various metal and non-metal materials, as described above, to provide compensation stresses.

In some examples, the material lines 611a-617b provide different compensation stresses that interact with the compensation stresses introduced by the other material lines. For example, material lines 611a and 611b may introduce a compressive compensation stress which applies a downward force towards the waveguide 601. The material lines 612a and 612b may apply a tensile compensation stress which interacts with the compressive compensation stress from the material lines 611a and 611b (and the other material lines) to provide an overall appropriate compensation stress to the waveguide 601.

In some examples, an electrical current is introduced to the material lines 611a-617b which allows for a controlled expansion or diminution to the material lines to be introduced to the compensation structure 610. The thermal expansion and subsequent compensation stresses may be controlled by the electrical currents driven through the material lines.

The composition, the pattern of the compensation structure, as well as the position of the compensation structure 610 is determined in order to provide the appropriate compensation stress onto the waveguide 601. For example, a dimension 622 of the materials lines 611a-617b is determined in order to ensure the compensation structure provides an appropriate stress on the waveguide 601 (as shown in FIG. 2B-5B). A dimension 621 and a distance 623 can also be determined in order to ensure that the compensation stress properly interacts with the waveguide 601 and that the compensation structure does not cause unwanted optical interference or other unwanted interference in the waveguide 601. Additional details for determined the structure and fabricating the compensation structure described in FIGS. 1-6 are described in relation to FIG. 7.

Figure 7:
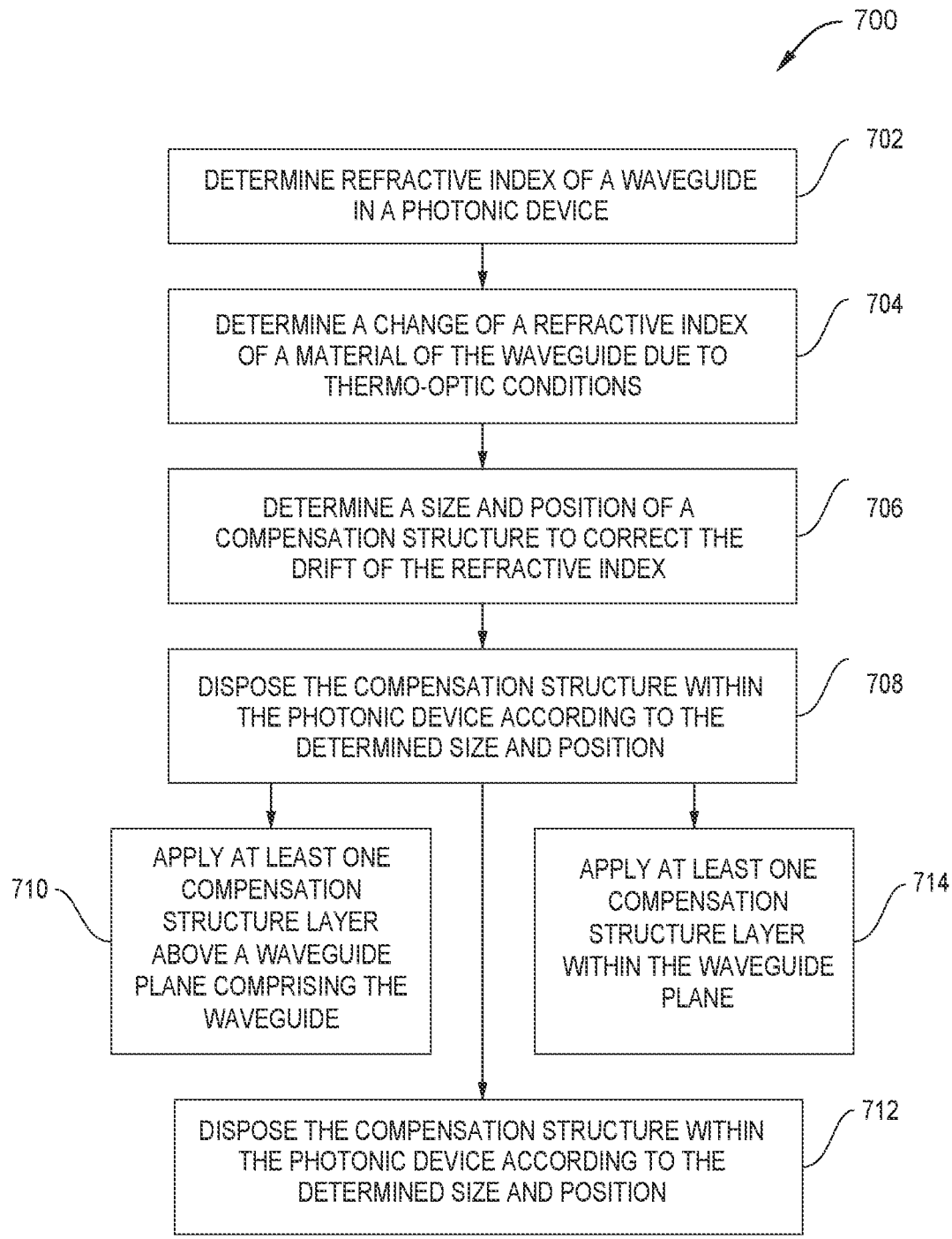
FIG. 7 is a flowchart illustrating operations of an example method for the production of a waveguide with a compensation structure, according to one embodiment.

FIG. 7 is a flowchart illustrating operations of an example method, method 700 for the production of a waveguide with a compensation structure, according to one embodiment. The steps of method 700 may be performed by the various elements of a fabrication system 801 described in relation to FIG. 8, including a refractive index module 811, a size and position module 812, foundry module 813, and foundry tools 840.

Method 700 begins at block 702 where the refractive index module 811 determines a first refractive index of a waveguide in a photonic device. In some examples. The refractive index module 811 utilizes refractive index data 821 of FIG. 8 for the waveguide to determine the first desired refractive index. For example, for the first arm 120 in the device 100, the refractive index module 811 utilizes material information for the waveguide of the first arm 120 as well as information related to function of the arrangement 105 to determine the first refractive index. For example, the first refractive index of the waveguide allows the optical signals to correctly propagate through the waveguides and photonic elements of the arrangement 105 (e.g., propagate as signal 241 as described in relation to FIG. 1B). In some examples the first refractive index is a refractive index at a first temperature such as a non-operating temperature of the first waveguide (e.g., the first arm 120) or other standard temperature representing a typical refractive index for the waveguide.

At block 704, the refractive index module 811 determines a change of a refractive index of a material of the waveguide due to thermo-optic conditions. For example, using the material information in refractive index data 821 and expected operating conditions of the waveguide (e.g., the first arm 120) the refractive index module 811 determines an amount the refractive index of the material of the waveguide will increase or otherwise change when temperatures increase as described in relation to FIG. 2A. In some examples, the thermo-optic conditions are caused by increasing temperatures during the operation of the photonic device (e.g., the device 100) or other changed environmental temperature factors.

At block 706, the size and position module 812 determines a size and position of a compensation structure to alter or otherwise correct the drift of the refractive index of the material to the first refractive index. For example, using the determined first refractive index and the expected or determined change of the refractive index, the size and position module 812 determines a size or other composition of the compensation structure. For example, the compensation structure may be a combination of any of the arrangements described in FIGS. 3A-6 and determined to provide any necessary compensation stress on the waveguide including compressive and/or tensile compensation stresses. The magnitude of the temperature compensation can be adjusted by selecting the appropriate metal layers and patterns. Backend layers are defined by high-quality lithography; thus, the position and width of metal lines can be defined accurately. Several metal lines can be stacked on top of each other to reinforce the effect. As a result, the stress profile in the waveguide core can be adjusted as desired to match the requirements presented by the core material and waveguide cross section.

The size and position module 812 also determines the location including any offset distances, such as dimension 621, and protective distances, such as the distance 623 and 160 to ensure the compensation stress interacts with the waveguide without causing unwanted optical interference.

At block 708, the foundry module 813 causes the foundry tools 840 to dispose the compensation structure within the photonic device according to the determined size and position. The foundry tools may include existing processing technology and the compensation structures may be applied without any foundry process changes. For example, photonic circuits are commonly produced in semiconductor foundries, using CMOS-compatible processes. Metal lines are part of the portfolio of any semiconductor foundry, as they are used for routing of electric power and signals in the backend. The metal lines used for temperature compensation in the compensation structures are sufficiently far away from the photonic waveguide so as to not interfere with light propagation, but close enough for the locally generated strain to reach the waveguide core (tens of microns). This arrangement is consistent with the processes of commercial semiconductor foundries, where several backend metal layers of different thicknesses and spacing's from the photonic layer are offered in this regime.

In some examples, a plurality of material layers of the compensation structure are disposed in a plurality of manufacturing processes as described in blocks 710, 712, and 714. For example, backend layers are created on top of the photonic layer containing the waveguides where the compensation structure layer is applied above a waveguide plane comprising the waveguide at block 710. However, for the purpose of temperature compensation, lines of different materials may be introduced in the same plane as the waveguide material, or even under the waveguide as shown in FIGS. 3A-5B. To generate lines in the same plane as the waveguides, the waveguide material may be removed, e.g. by etching, and the compensation structure layer or at least one further compensation structure layer is applied within the waveguide plane at block 714. Lines under the waveguide may be deposited and structured before the waveguide layer, or could be added at a later time if the bottom of the waveguide is made accessible, e.g. by backside-etching of the carrier substrate, where at least one compensation structure layer or at least one additional compensation structure layer is applied below the waveguide plane at block 712.

Figure 8:
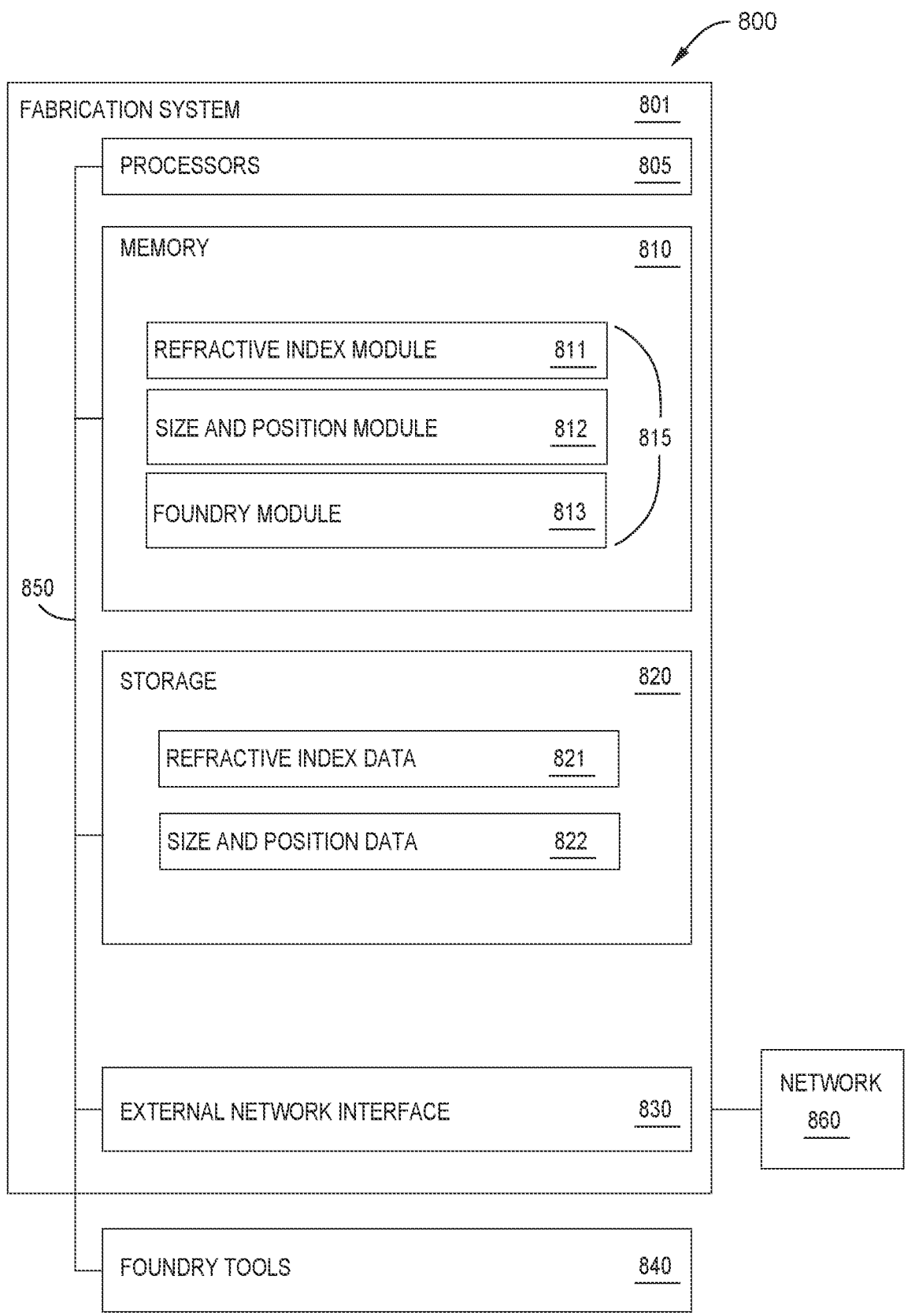
FIG. 8 illustrates a fabrication system, according to one embodiment.

FIG. 8 illustrates a fabrication system 801, according to one embodiment. The arrangement 800 may include a computer embodied as a fabrication system 801, foundry tools 840, and network 860, where the arrangement 800 is configured to perform the methods described herein. The fabrication system 801 is shown in the form of a general-purpose computing device. The components of fabrication system 801 may include, but are not limited to processing units or processors 805, a system memory, memory 810, a storage system, storage 820, network interface 830, and a bus 850 that couples various system components including the system memory, memory 810 and storage system, storage 820, to processors 805 along with the network interface 830 and various input/output components and the network 860. In other embodiments, arrangement 800 is distributed and includes a plurality of discrete computing devices that are connected through wired or wireless networking.

Bus 850 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The fabrication system 801 typically includes a variety of computer system readable media. Such media may be any available media that is accessible by fabrication system 801, and it includes both volatile and non-volatile media, removable and non-removable media.

The memory 810 can include computer system readable media in the form of volatile memory, such as random access memory (RAM) and/or cache memory. Fabrication system 801 may further include other removable/non-removable, volatile/non-volatile computer system storage media. In some examples, 820 may be included as part of memory 810 and may typically provide a non-volatile memory for the networked computing devices, and may include one or more different storage elements such as Flash memory, a hard disk drive, a solid state drive, an optical storage device, and/or a magnetic storage device. For example, storage system, storage 820, can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 850 by one or more data media interfaces. Storage 820 may include media for storing the refractive index data 821 and the size and position data 822 and other data described herein.

Memory 810 may include a plurality of program modules 815 for performing various functions related to the fabrication system 801 described herein. The program modules 815 generally include program code that is executable by one or more of the processors 805. As shown, program modules 815 include the refractive index module 811 and size and position module 812 to perform the functions related to production of the various photonic devices and arrangements described herein. The program modules 815 may also interact with each other and storage system, storage 820, to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An integrated photonic device comprising:
a first layer comprising a waveguide comprising a refractive index, wherein the refractive index changes according to a thermo-optic effect as a temperature of the integrated photonic device fluctuates, and wherein the waveguide comprises a ridge protruding in a first direction from a base of the waveguide, wherein the ridge is disposed between the base of the waveguide and a compensation structure; and
a second layer comprising the compensation structure, wherein the first layer is spaced apart from the second layer by a first distance, wherein the compensation structure applies a compensation stress on the waveguide as the temperature of the integrated photonic device fluctuates, wherein the compensation stress alters the thermo-optic effect on the refractive index of the waveguide.

2. The integrated photonic device of claim 1, wherein the first distance provides a protective distance between the compensation structure and the waveguide, wherein the protective distance prevents optical interference from the compensation structure on the waveguide.

3. The integrated photonic device of claim 1, wherein the compensation structure comprises at least one metal material in the second layer.

4. The integrated photonic device of claim 1, wherein the compensation structure comprises at least one material in the second layer comprising a semiconductor, metalloid material, or a nonmetal material.

5. The integrated photonic device of claim 1, wherein the second layer comprises a single material layer, wherein the single material layer is positioned in a facing relationship with the ridge on the waveguide at the first distance.

6. The integrated photonic device of claim 1, wherein the compensation structure comprises at least two split material lines, wherein the at least two split material lines are positioned in the second layer, wherein the second layer is positioned in a facing relationship with the ridge on the waveguide at the first distance, and wherein the at least two split material lines are positioned in the second layer at an offset distance relative to the waveguide.

7. The integrated photonic device of claim 1, further comprising a second compensation structure comprising at least two split material lines, wherein the at least two split material lines are positioned in the first layer, wherein a first split line is positioned on a first side of the waveguide at the first distance, and wherein a second split line is positioned on a second side of the waveguide at the first distance.

8. The integrated photonic device of claim 1, wherein the compensation stress applied by the compensation structure is uncontrolled.

9. An integrated photonic device comprising:
a first layer comprising:
a first arm waveguide with a first optical phase; and
a second arm waveguide with a second optical phase, wherein a difference between the first optical phase and the second optical phase changes according to a thermo-optic effect as a temperature of the first arm waveguide and the second arm waveguide fluctuates; and
a second layer comprising a compensation structure, wherein the first layer is spaced apart from the second layer by a first distance, wherein the compensation structure applies a compensation stress on the at least one the first arm waveguide or the second arm waveguide as a temperature of the compensation structure fluctuates, wherein the compensation stress alters the thermo-optic effect on the difference between the first optical phase and the second optical phase.

10. The integrated photonic device of claim 9, wherein the first distance provides a protective distance between the compensation structure and the at least one the first arm waveguide or the second arm waveguide, wherein the protective distance prevents optical interference from the compensation structure on the at least one the first arm waveguide or the second arm waveguide.

11. The integrated photonic device of claim 9, wherein the compensation structure comprises at least one metal material in the second layer.

12. The integrated photonic device of claim 9, wherein the compensation structure comprises at least one material in the second layer comprising a semiconductor, metalloid material, or a nonmetal material.

13. The integrated photonic device of claim 9, wherein the second layer comprises a single material layer, wherein the single material layer is positioned in a facing relationship with a ridge on the at least one the first arm waveguide or the second arm waveguide.

14. The integrated photonic device of claim 9, wherein the compensation structure comprises at least two split material lines, wherein the at least two split material lines are positioned in the second layer, wherein the second layer is positioned in a facing relationship with a ridge of the at least one the first arm waveguide or the second arm waveguide at the first distance, and wherein the at least two split material lines are positioned in the second layer at an offset distance relative to the at least one the first arm waveguide or the second arm waveguide.

15. The integrated photonic device of claim 9, wherein the at least one the first arm waveguide or the second arm waveguide comprises a ridge protruding in a first direction from a base of the at least one the first arm waveguide or the second arm waveguide, wherein the ridge is disposed between the base and the compensation structure.

16. The integrated photonic device of claim 9, further comprising a second compensation structure positioned at a second distance from the other of the at least one of the first arm waveguide or the second arm waveguide.

17. The integrated photonic device of claim 9, further comprising one of:
an optical filter;
an optical multiplexer; or
an optical demultiplexer.

18. A method comprising:
determining a first refractive index of a waveguide in an integrated photonic device;
determining a drift of a refractive index of a material of the waveguide due to thermo-optic conditions;
determining a size and a position of a compensation structure to alter the drift in photonic device properties; and
forming the compensation structure in a second layer of the integrated photonic device that is on top of a first layer of the integrated photonic device comprising the waveguide according to the size and the position.

19. The method of claim 18, wherein disposing the compensation structure within the integrated photonic device comprises at least one of:
   forming a third layer between the first and second layer so that the waveguide is spaced apart from the compensation structure.

20. The method of claim 18, wherein the compensation structure comprises a plurality of material layers.

* * * * *